(12) United States Patent
Chan et al.

(10) Patent No.: US 7,598,000 B1
(45) Date of Patent: Oct. 6, 2009

(54) ALKALI-HYDROXIDE MODIFIED POLY-VINYLIDENE FLUORIDE/POLYETHYLENE OXIDE PROTECTIVE POLYMER BLEND COATING FOR LITHIUM METAL

(75) Inventors: Yuk Chan, Eatontown, NJ (US); Terrill B. Atwater, North Plainfield, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 874 days.

(21) Appl. No.: 11/031,949

(22) Filed: Jan. 5, 2005

(51) Int. Cl.
*H01M 4/02* (2006.01)

(52) U.S. Cl. .................. 429/231.95; 429/209; 429/129; 429/131; 429/144

(58) Field of Classification Search .................. None
See application file for complete search history.

(56) References Cited

U.S. PATENT DOCUMENTS

| | | | |
|---|---|---|---|
| 5,348,726 A * | 9/1994 | Wang et al. | 423/605 |
| 5,705,084 A * | 1/1998 | Kejha | 252/62.2 |
| 6,492,046 B1 | 12/2002 | Payne et al. | |
| 7,318,983 B2 * | 1/2008 | Adachi et al. | 429/241 |
| 2005/0170248 A1 * | 8/2005 | Zhang et al. | 429/217 |

* cited by examiner

*Primary Examiner*—Patrick Ryan
*Assistant Examiner*—Cynthia Lee
(74) *Attorney, Agent, or Firm*—Michael Zelenka; George B. Tereschuk

(57) ABSTRACT

An anode for a metal-air battery has an electrode and a metal foil interconnected with the electrode. A barrier layer surrounds the metal foil and includes a polymer blend that substantially reduces the passage of moisture therethrough while permitting the passage of ions therethrough. A method of making the barrier layer is also presented.

7 Claims, 1 Drawing Sheet

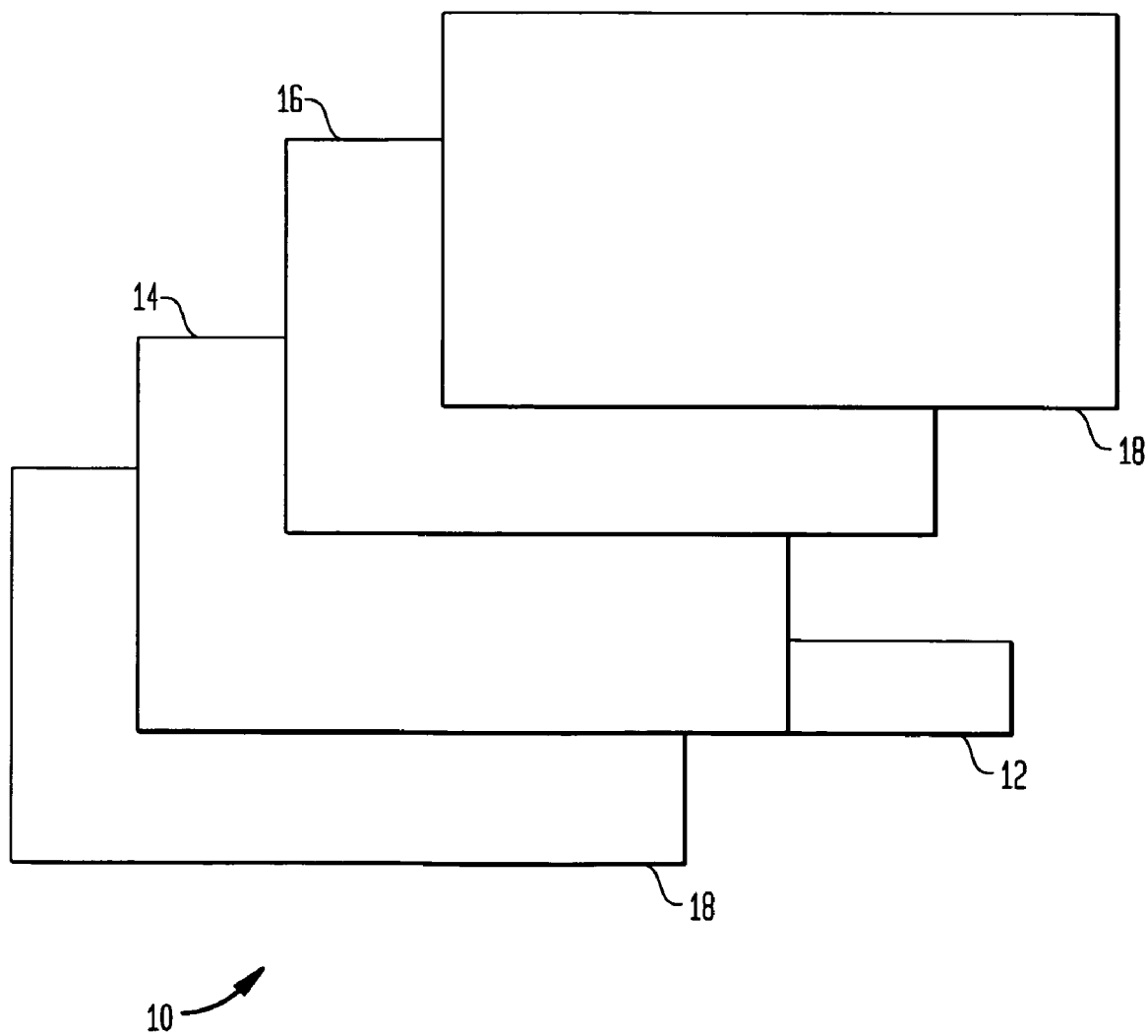
FIGURE

ALKALI-HYDROXIDE MODIFIED POLY-VINYLIDENE FLUORIDE/POLYETHYLENE OXIDE PROTECTIVE POLYMER BLEND COATING FOR LITHIUM METAL

GOVERNMENT INTEREST

The invention described herein may be manufactured, used, imported, sold, and licensed by or for the Government of the United States of America without the payment of any royalty thereon or there for.

BACKGROUND OF THE INVENTION

1. Field of the Invention

The present invention relates generally to electrochemical power sources and, more particularly, to metal-air batteries.

2. Related Art

Metal-air batteries may provide a very desirable power source for many small portable electronic devices. For example, lithium-air batteries may have a relatively large specific capacity of 3,861 Ah/kg and energy density of 13 kW-h/kg while also having relatively small spatial requirements. However, a problem that arises in the use of metal-air batteries involves, e.g., the non-compatibility of the metal with the moisture in the air. In particular, lithium may be oxidized violently in the presence of the moisture or water whereby safety concerns may be raised.

Currently, no suitable means of substantially reducing the effects of moisture in metal-air batteries is available.

SUMMARY OF THE INVENTION

In accordance with an embodiment of the present invention, an anode for a metal-air battery comprises an electrode and a metal foil interconnected with the electrode. A barrier layer surrounds the metal foil and comprises a polymer blend that substantially reduces the passage of moisture therethrough while permitting the passage of ions therethrough.

In another embodiment of the present invention, a method of making an anode, comprises preparing a barrier layer, comprising hydrolyzing polyvinylidene fluoride (pVdF) in an alkali-hydroxide solution to form a mixture; separating hydrolyzed pVdF from the pVdF and the alkali-hydroxide solution; dissolving hydrolyzed pVdF, polyethylene oxide (PEO) and lithium hexafluorophosphate in a solvent; and removing the solvent to thereby leave a polymer blend for use as a barrier layer; thereafter, providing a metal foil; and surrounding the metal foil with the barrier layer.

BRIEF DESCRIPTION OF THE DRAWINGS

The following detailed description is made with reference to the accompanying drawings, in which:

The FIGURE is an exploded view of an anode in accordance with an embodiment of the present invention.

DETAILED DESCRIPTION OF THE PREFERRED EMBODIMENT

One embodiment of the present invention concerns an anode for a metal-air battery that is configured to reduce a reaction between the anode, which comprises a lithium metal sheet, and moisture in the air. In one particular embodiment of the invention, a barrier layer is provided that surrounds the metal sheet and functions to substantially reduce passage of moisture while permitting the passage of oxygen and lithium ions therethrough. The barrier layer may comprise a modified polyvinylidene fluoride and a polyethylene oxide blend.

Referring now to the exploded view of the FIGURE, an anode that is in accordance with one embodiment of the present invention is illustrated generally at 10. In this embodiment, the anode 10 comprises a terminal 12, a wire-mesh layer 14, a metal foil 16, and barrier layers 18. The terminal 12 may comprise a conductive substance such as nickel and may be configured in any geometric shape that is suitable for mating with a device (not shown) to be energized. The wire-mesh layer 14 may also comprise nickel and is configured to provide enhanced electrical contact across a surface (not numbered) of the metal foil 16. The metal foil 16 may comprise lithium and may be approximately 0.006 inch in thickness.

In accordance with a feature of the present invention, the barrier layers 18 are provided for substantially reducing contact between the metal foil 16 and moisture in the air. The barrier layers 18 may be joined together, during fabrication of the anode 10, to surround and cover the metal foil 16. It will be understood that while multiple barrier layers 18 are shown, these layers are referred to herein for illustrative purposes and instead of multiple barrier layers, a coating or encapsulating material may be employed to cover the metal foil 16.

As exemplified below, it has been found that the barrier layers 18 may comprise a polymer blend of polyvinylidene fluoride and polyethylene oxide. Also, an alkali-hydroxide solution may be employed in order to modify the chemical and physical characteristics of polyvinylidene fluoride prior to blending with the polyethylene oxide. Further, lithium hexafluorophosphate may be combined with the polymer blend of polyvinylidene fluoride and polyethylene oxide in order to conduct ions from the cathode and anode current collectors. Preferably, each barrier layer 18 comprises polyvinylidene fluoride that is greater than approximately 75 percent by weight and more preferably ranges between approximately 75 percent and 80 percent by weight. Polyethylene oxide preferably ranges between approximately 10 percent and 15 percent by weight and lithium hexafluorophosphate preferably ranges between approximately 10 percent and 15 percent by weight.

It is believed that during operation of the anode 10, the barrier layers 18 allow passage of lithium and oxygen ions in order to facilitate the oxidation and reduction reactions necessary for generation of electrical power. Lithium is oxidized to lithium carbonate and lithium oxide within the barrier.

In accordance with another feature of the present invention, a method of making a barrier layer 18 comprises reacting polyvinylidene fluoride (pVdF) in an excess lithium hydroxide solution. The reaction is continued until a dark brown paste settles to the bottom that may be 90% by weight efficient of initial pVdF. After centrifuging, the brown paste may be removed, rinsed with distilled water and then dried. The dried brown paste, comprising lithiated or hydrolyzed pVdF, may then be formed into a solid polymer blend film that may be used as a barrier layer.

In one particular embodiment, the polymer blend or barrier layer may be prepared by dissolving hydrolyzed pVdF in 1-methyl-2-pyrrolidione (nMP) and then adding polyethylene oxide (PEO) and lithium hexafluorophosphate to form a polymer blend mixture. The polymer blend mixture may then be heated until all three components are dissolved. The mixture may then be allowed to cool to room temperature and formed into a thin layer by coating onto a flat sheet of Teflon or glass.

An anode 10 may then be prepared by pressing together a metal foil, e.g., comprising lithium, with a wire-mesh, e.g., comprising nickel, and then removing excess nickel. A pair of barrier layers, previously prepared of hydrolyzed pVdF/PEO as described above, may then be located on opposing sides of the lithium foil and then pressed together under, e.g., 5000 pounds per square inch of pressure.

Example I

A polyvinylidene fluoride (pVdF) was obtained from the Polyscience Corporation of Warrington, Pa. and Lithium hydroxide, a 98% solution, was obtained from Alfa Aesar Corporation of Ward Hill, Mass. Five grams of pVdF was placed into a 50 mL centrifuge tube. Thereafter, a three molar solution of lithium hydroxide was poured into the centrifuge tube until it reached the 50 mL line. The mixture was shaken and left for at least 24 hours. After 24 hours, the mixture turned from a white color to a pinkish color. More solid lithium hydroxide was put into the mixture to increase the degree of reaction. The mixture was shaken and left alone for another 24 hours. This process was repeated until a dark brown paste settled to the bottom of the centrifuge tube. At this point, the mixture was placed in a centrifuge for 10 minutes at 8000 rpm to separate the brown paste from the pinkish pVdF that floated on the top of the mixture. The brown paste was then removed and placed into an extraction thimble used in a Soxhlet apparatus. Distilled water was used to wash the brown paste of any traces of lithium hydroxide (thirty to forty washes). After the brown paste was removed, it was put into a vacuum dryer for about 24 hours at 100° C. The brown paste, now a powder, lithiated pVdF, was removed.

A polymer blend was prepared by dissolving 3.058 g of hydrolyzed pVdF in 1-methyl-2-pyrrolidione (nMP). After the hydrolyzed pVdF dissolved, 0.410 g of polyethylene oxide (PEO), with an average molecular weight of 100K, obtained from the Aldrich Corporation of Milwaukee, Wis., and 0.450 g lithium hexafluorophosphate was added to the dissolved hydrolyzed pVdF solution. Altogether, the hydrolyzed pVdF comprised a weight percent of 78%, PEO comprised a weight percent of 10.5% and lithium hexafluorophosphate comprised a weight percent of 11.5%. The mixture was then heated until all three components were dissolved in nMP. The mixture was then cooled to room temperature and then applied, at a thickness of 0.002 inches, to a clean glass-plate using a coating bar to form a barrier layer. The barrier layer or film was dried at 50° C. until the liquid evaporated and then placed into a vacuum oven for 24 hours at 50° C.

Lithium foil was obtained from the Foote Corporation of Exton, Pa. with a thickness of 0.006 inches for use as an anode. In a dry room, a press available from the Carver Corporation of Wabash, Ind. was employed to press, under 12 tons of pressure, the lithium foil onto a nickel wire-mesh. Excess nickel was removed from the edges of the lithium foil. The polymer blend of hydrolyzed pVdF/PEO or barrier layer was then disposed about the lithium foil and wire-mesh and pressed under 12 tons of pressure. Excess polymer blend was then removed.

The anode was then brought out of the dry room to expose it to ambient humidity. After several weeks, no deterioration of the quality of lithium metal was observed.

Example II

An anode was prepared according to Example I excepting that a barrier layer to protect a lithium foil instead comprised, in weight percent, 81% modified pVdF, 9% PEO and 10% lithium hexafluorophosphate. The lithium foil had a weight of 0.0214 g an area of 3.27 $cm^2$.

Example III

An anode was prepared according to Example I excepting that a barrier layer to protect a lithium foil instead comprised, in weight percent, 78% modified pVdF, 10% PEO and 12% lithium hexafluorophosphate. The lithium foil had a weight of 0.0227 g an area of 3.17 $cm^2$.

Each of the anodes from the above examples and others, not described herein, was observed for deterioration of the lithium metal foil after exposure to ambient humidity for several weeks. It was found that the polymer blends that were the most successful had a ratio of hydrolyzed pVdF of greater than 75% by weight. The polymer film was pliable and stable.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. An anode for a lithium battery with a plurality of solid, polymeric blend, protective barrier layers, comprising:
    a terminal;
    a wire-mesh layer interposed between said terminal and a one of said plurality of barrier layers;
    a metal foil layer is wrapped around said wire-mesh layer and surrounded by another one of said plurality of barrier layers;
    said wire-mesh layer and said metal foil layer being connected to said terminal;
    said plurality of barrier layers being composed of a mixture of an alkali-hydroxide modified polyvinylidene fluoride, polyethylene oxide, and lithium hexafluorophosphate;
    said alkali-hydroxide modified polyvinylidene fluoride being in a range of between approximately 75 percent by weight and 85 percent by weight;
    said polyethylene oxide being in a range of between approximately 5 percent by weight and 10 percent by weight;
    said lithium hexafluorophosphate being in a range of between approximately 10 percent by weight and 15 percent by weight; and
    said plurality of barrier layers allow passage of lithium ions and oxygen ions therethrough to said metal foil layer providing a multitude of oxidation reactions and reduction reactions and prevents unwanted contact between external moisture and said metal foil layer to generate electrical energy in said lithium battery at an increased level of stability.

2. The anode for the lithium battery with the plurality of solid, polymeric blend, protective barrier layers, as recited in claim 1, further comprising:
    said alkali-hydroxide modified polyvinylidene fluoride (pVdF) having a weight percentage of approximately 81%;
    said polyethylene oxide (PEO) having a weight percentage of approximately 9%; and
    said lithium hexafluorophosphate having a weight percentage of approximately 10%.

3. The anode for the lithium battery with the plurality of solid, polymeric blend, protective barrier layers, as recited in claim 1, further comprising:
    said alkali-hydroxide modified pVdF having a weight percentage of approximately 78%;
    said PEO having a weight percentage of approximately 10%; and
    said lithium hexafluorophosphate having a weight percentage of approximately 12%.

4. The anode for the lithium battery with the plurality of solid, polymeric blend, protective barrier layers, as recited in claim 2, wherein said wire-mesh layer is comprised of nickel.

5. A solid, polymeric blend, protective barrier layer for an anode of a lithium metal-air battery, comprising:
    said anode having a terminal, a wire-mesh layer, and a metal foil layer,
    said wire-mesh layer being interposed between said terminal and said barrier layer;
    said metal foil layer being wrapped around said wire-mesh layer and surrounded by said barrier layer;
    said wire-mesh layer and said metal foil layer being connected to said terminal;
    said barrier layer being composed of a mixture of an alkali-hydroxide modified polyvinylidene fluoride, polyethylene oxide and lithium hexafluorophosphate;
    said alkali-hydroxide modified polyvinylidene fluoride being in a range of between approximately 75 percent by weight and 85 percent by weight;
    said polyethylene oxide being in a range of between approximately 10 percent by weight and 15 percent by weight;
    said lithium hexafluorophosphate being in a range of between approximately 10 percent by weight and 15 percent by weight;
    said barrier layer being subdivided into a plurality of barrier layers; and
    said plurality of barrier layers allow passage of lithium ions and oxygen ions therethrough to said metal foil layer providing a multitude of oxidation reactions and reduction reactions and prevents unwanted contact between external moisture and said metal foil layer to generate electrical energy in said battery at an increased level of stability.

6. The solid, polymeric blend, protective barrier layer for the anode of the lithium metal-air battery, as recited in claim 5, further comprising:
    said alkali-hydroxide modified polyvinylidene fluoride (pVdF) having a weight percentage of approximately 81%;
    said polyethylene oxide (PEO) having a weight percentage of approximately 9%; and
    said lithium hexafluorophosphate having a weight percentage of approximately 10%.

7. The solid, polymeric blend, protective barrier layer for the anode of the lithium metal-air battery, as recited in claim 5, further comprising:
    said alkali-hydroxide modified pVdF having a weight percentage of approximately 78%;
    said PEO having a weight percentage of approximately 10%; and
    said lithium hexafluorophosphate having a weight percentage of approximately 12%.

* * * * *

UNITED STATES PATENT AND TRADEMARK OFFICE
CERTIFICATE OF CORRECTION

PATENT NO. : 7,598,000 B1  Page 1 of 1
APPLICATION NO. : 11/031949
DATED : October 6, 2009
INVENTOR(S) : Chan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1283 days.

Signed and Sealed this

Twenty-eighth Day of September, 2010

David J. Kappos
*Director of the United States Patent and Trademark Office*